June 29, 1937.   M. DE SIMÓ ET AL   2,085,525
PROCESS FOR STABILIZING POLYMERS
Filed Nov. 8, 1935
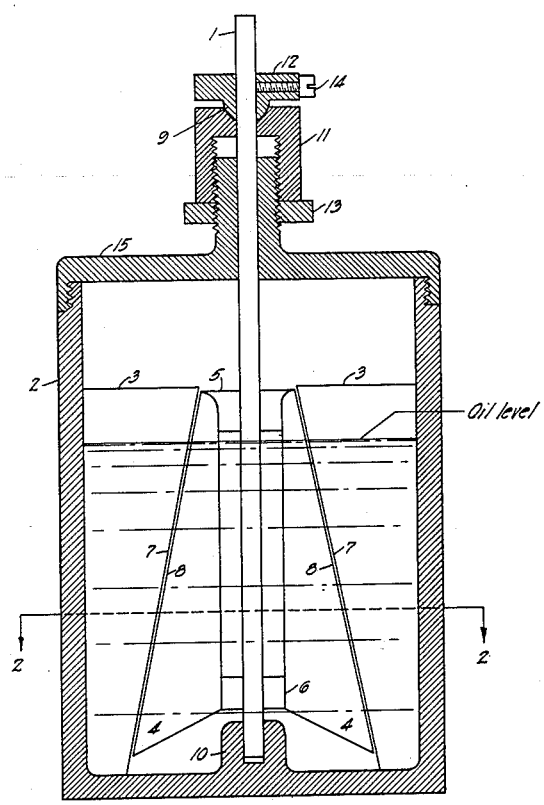
Fig. I.
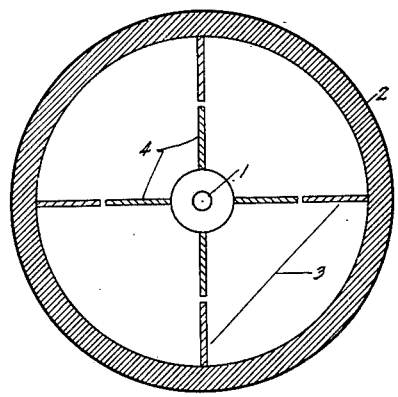
Fig. II.
Inventors: Martin De Simo
Frederick B. Hilmer
By his Attorney:

UNITED STATES PATENT OFFICE 2,085,525

PROCESS FOR STABILIZING POLYMERS

Martin de Simó and Frederick B. Hilmer, Berkeley, Calif., assignors to Shell Development Company, San Francisco, Calif., a corporation of Delaware Application November 8, 1935, Serial No. 48,858

5 Claims. (Cl. 196—78)

This is a continuation-in-part of our application, Serial No. 38,991, filed September 3, 1935, and deals with a process of manufacturing mechanically stable blends of high molecular weight hydrocarbon polymers in hydrocarbon oils.

In the earlier application it has been pointed out that very large hydrocarbon polymers produced by polymerizing unsaturated hydrocarbons capable of forming polymeric homologous series, such as polymerized styrene, hydrogenated polymerized styrene, polymerized indene, hydrogenated rubber, hydrogenated polymerized diolefines, polymers produced from propylene or beta iso-olefines under the influence of polymerizing catalysts of the type of boron fluoride, or hydrogenated products of these polymers, are apt to be mechanically unstable. A test, called the shear viscosity breaking test, has been described, by means of which the degree of mechanical stability of such polymers can be determined. In this test a solution of polymers is exposed to an extensive working operation by subjecting it to a shearing action for 4 hours.

We have discovered that frequently solutions of polymers, which break down during the test, do not break down any further when worked beyond the required test period. This means, that formerly unstable polymers were converted probably by way of breaking them down to fragments into a type of polymers which are stable. Thus by exposing polymers to the said intense shearing or milling operation polymers were stabilized and made suitable for use in lubricating oils.

We have found that practically all mechanically unstable polymers can be stabilized by milling. The milling operation may be carried out in an apparatus operating on the principles of the test apparatus, as hereinafter described, or in a colloidal mill of any design, or in a kneading machine. Depending upon the type of apparatus used, the polymers may be worked in the presence or absence of solvents for the polymers.

The time of milling required for effective stabilization varies with the efficiency of the milling machine, as well as with the nature of the polymers. In the apparatus and under the milling conditions of the shear viscosity breaking test, different polymers may require from 1 to 100 hours to become effectively stabilized. In efficient colloidal mills, effective stabilization can sometimes be achieved in a few minutes.

The term effective stablization, as herein used, designates the mechanical stabilization to a point which is within the requirements for passing the shear viscosity breaking test, as hereinafter specified.

Conditions during the milling operation conducive to oxidation should be avoided to prevent deterioration of the polymers to gums, resins and other impurities insoluble in lubricating and other hydrocarbon oils. Air need not be excluded at temperatures below 100° C., it having little or no effect on the polymers at these temperatures. Above 100° C. air may cause oxidation and should, therefore, be excluded. Working temperatures should not exceed 200° C. even in the absence of air, cracking beginning to take place above 200° C. To avoid the necessity of having to exclude air, working temperatures are preferably kept below 100° C.

There is a definite advantage in utilizing the very large mechanically unstable polymers, after effectively stabilizing them, for use in lubricating oils. This is not only a matter of economy, but we have found that the stabilized fragmentary polymers resulting from our treatment are usually considerably more effective in the matter of raising the viscosity index than the best of stable crude polymers, i. e., the polymers which, as produced by polymerization of unsaturated hydrocarbons, are sufficiently stable to pass the shear viscosity breaking test; and, furthermore, such an improvement in viscosity index produced by the said stabilized polymers is achieved at the cost of an increase in viscosity which is smaller than that caused by stable crude polymers for the same viscosity index improvement. It is well known to be important, that the increase in viscosity for a given improvement in the viscosity index be as small as possible.

When producing polymers of the type herein described by catalytic polymerization of unsaturated hydrocarbons, mixtures are obtained containing polymer bodies of widely different molecular weight. We have found that crude mixtures of polymers, i. e., mixtures which have not been fractionated as described in our copending application, Serial No. 38,991, filed September 3, 1935, or which have not been milled in accordance with the present invention, having average molecular weights in excess of 10,000 are invariably unstable under the conditions of the shear viscosity breaking test, because, besides smaller molecules, they also contain molecules which due to their excessive size when mechanically acted upon, are apparently broken. Stable fragmentary polymers on the other hand, i. e., polymers obtained by milling excessively large mechanically unstable polymers which have been estimated to possess molecular weights of the order of 150,000 and higher, appear to have average molecular weights above 10,000 and up to about 100,000. On the basis of equal stability and for the purpose of raising the viscosity index, stabilized originally unstable polymers are thus more desirable than stable crude polymers, since the capacity to improve viscosity index is in general a direct function of the molecular weight of the polymers.

In the following illustrative example comparative results are shown of two blends made by dissolving hydrocarbon polymers in a pale oil of 200 Saybolt universal viscosity seconds at 100° F. Both blends have the same viscosity index, both are mechanically stable within the requirements of the shear viscosity breaking test, but the quantities of polymers used and the resulting incidental viscosities differ widely.

The first blend was prepared by dissolving 1% of a very unstable polymer of an estimated molecular weight of 180,000 in the pale oil, and working it for 100 hours. Tests showed that it was effectively stabilized after this period. During the working the viscosity of the blend dropped to about ¼ of the original value.

The second blend was prepared by dissolving in the pale oil a sufficient quantity of a mechanically stable crude polymer, known to display the highest viscosity index raising capacity of which crude polymers of original mechanical stability are capable, to obtain the same viscosity index as in the first worked blend. Below are the properties of the two blends:

|  | Blends prepared with | |
| --- | --- | --- |
|  | Stabilized polymers | Stable crude polymers |
| Approx. molecular weight of original polymer | 180,000 | 10,000 |
| Percent of polymer in blend | 1 | 3.2 |
| Properties of the blend: | | |
| Viscosity index | 108 | 109 |
| Saybolt universal viscosity at 100° F | 488 | 600 |
| Saybolt universal viscosity at 210° F | 65.7 | 72.5 |
| Effective stability | OK | OK |

Stable blended lubricating oils made from hydrocarbon oils and mechanically unstable polymers are usually produced by one of three methods. One method consists of blending the requisite amount of unstable polymers with the hydrocarbon oil and milling the resulting solution until stable as determined by the shear viscosity breaking test. Another method consists of producing a concentrate stock solution of polymers in a hydrocarbon oil, said stock solutions being sufficiently fluid to be millable, and milling it until stable. The hydrocarbon oil used in this second method may be of the type of a lubricating oil, in which case the stock solution is used as a regular blending stock in accordance with common refinery practice; or the solvent for polymers may be a volatile solvent such as pentane, hexane, benzene, solvent naphtha, or other liquid hydrocarbons, in which case it may be removed by distillation before or after blending the polymer with a mineral lubricating oil. In the third method the polymer is milled in the absence of a solvent, usually at an elevated temperature sufficient to liquefy and/or to lower its viscosity, but insufficient to cause pyrolysis, and is blended to the mineral lubricating oil in the requisite amount after stabilization.

In the foregoing specification we have used the term "fragmentary polymers" and "fragments of polymers", by which are meant products of a mechanical disruption of certain types of very large polymers. While it is our theory that this disruption or conversion consists largely of an actual breaking to pieces of the long chained molecules, there is the possibility of other reactions taking place: It might be, that what takes place is a mere disentangling of molecules which during their formation became entangled with each other and thus formed agglomerates. Whatever the real cause of the conversion may be, it shall be understood that the term "fragments" as herein used, applies to products of milling mechanically unstable polymers.

In the following, the apparatus used in the shear viscosity breaking test, hereinbefore mentioned, and its operation are explained. A reference is now had to the drawing. Figure I represents a cross-sectional elevation view of said apparatus and Figure II is a cross-sectional view taken on line 2—2 of Figure I.

In Figure I, vertical rotatable shaft 1 is disposed in the axis of cylindrical cup 2. The dimensions of the cup 2 are such that 200 milliliters of liquid fill the cup about ⅔ full to level 0. The ratio of inside diameter to inside height of the cup is approximately 2 to 3.

Stationary blades 3, radially arranged and firmly attached to the inside of cup 2, or to a removable support, not shown, fitting snugly into cup 2, extend from the bottom to about ¾ of the height of the cup. At their upper end they reach farther toward the axis of the cup than at their lower end. Another set of blades 4 is attached to shaft 1 by means of brackets 5 and 6. Opposing edges 7 and 8 of the two sets of blades 3 and 4 are straight and so designed, that when the shaft rotates, they barely clear each other along their entire length.

The shaft 1 rests in top bearing 9 and bottom bearing 10. Top bearing 9 can be adjusted vertically with relation to cup 2 by means of adjusting screw 11. By turning screw 11 one way or another the two sets of blades can be made almost, but not quite, to touch each other along the full length of their respective edges 7 and 8. To obtain a good shearing action the clearance between the edges 7 and 8 should be of the order of .1 millimeter.

The shaft 1 is held by collar support 12 with the aid of set screw 14, the collar support 12 in turn resting in bearing 9. Lock nut 13 secures adjusting nut 11 in a once chosen position.

The top 15 of cup 2 is removable to permit easy filling and emptying of the cup.

In Figure 2, the inside of cup 2 is shown to carry the four radially arranged stationary blades 3, the latter barely clearing the rotatable blades 4 attached to shaft 1 by brackets not shown.

The shaft is driven by a motor, not shown, directly or by way of a transmission, at a constant speed of 5,000 R. P. M.

In carrying out the test, a solution is prepared of 2% of the polymers in a stable, well refined mineral oil having a Saybolt universal viscosity at 100° F. of 200 seconds and a viscosity index of about 35. 200 milliliters of this solution are placed into the described apparatus and worked for 4 hours, the rotatable blades rotating at 5000 R. P. M. The 200 milliliters of oil are thereby exposed to 20,000 shears per minute. We have found that if the above 2% solution of polymers loses not more than 5% viscosity as measured in Saybolt universal seconds, the polymers are substantially stable and satisfactory for use in gears and engines, and are considered to have passed the test. Conversely, if the test solution loses more than 5% viscosity, the polymers being insufficiently stable and unsuitable for use in engines and gears, are pronounced to have failed in the shear-viscosity breaking test.

Shear viscosity breaking tests are generally started at room temperature, i. e., at about 15-20° C. In the course of the test the oil warms up considerably due to the shearing and churning action of the blades. It was found that since the stability of the polymers is normally little affected by temperatures below 200° C., there is no need for controlling the temperature of the test by cooling, unless it exceeds 100° C. when suitable cooling should be applied.

We claim as our invention:

1. In the process of producing polymers of the type obtained by polymerizing unsaturated hydrocarbons capable of forming polymeric homologous series by means of a polymerization catalyst of the type of boron fluoride, which are substantially mechanically stable in solution of mineral lubricating oils under lubricating conditions, from polymers of the same type having molecular weights substantially in excess of 10,000 and which break down under lubricating conditions, the steps comprising subjecting the unstable polymers to a milling operation of the type performed in a colloid mill and of sufficient intensity to effect a mechanical break down of unstable polymers to products of lower molecular weights, and continuing this treatment for at least a time sufficient to render the product stable to the shear viscosity breaking test herein described.

2. The process of claim 1, in which the polymers are dissolved in a hydrocarbon solvent prior to subjecting them to the milling operation.

3. The process of claim 1 in which the polymers are dissolved in a mineral lubricating oil prior to subjecting them to the milling operation.

4. In the process of producing poly-isobutylenes which are substantially mechanically stable in solution of mineral lubricating oils under lubricating conditions from mechanically unstable poly-isobutylenes of molecular weights in excess of 100,000, which break down under lubricating conditions, the steps comprising subjecting the unstable poly-isobutylenes to a milling operation of the type performed in a colloid mill and of sufficient intensity to effect their breakdown to lower molecular weight components, and continuing the treatment for a time sufficient to lower the molecular weight of the unstable poly-isobutylenes to below 100,000.

5. The process of claim 1 in which the milling is carried out at substantially normal temperatures below about 100° C.

MARTIN DE SIMÓ.
FREDERICK B. HILMER.

DISCLAIMER 2,085,525.—*Martin de Simó*, and *Frederick B. Hilmer*, Berkeley, Calif. PROCESS FOR STABILIZING POLYMERS. Patent dated June 29, 1937. Disclaimer filed September 9, 1940, by the assignee, *Shell Development Company*.

Hereby enters this disclaimer to claims 1, 2, and 3 of said Letters Patent, but does not disclaim claim 5 which is dependent upon claim 1.

[*Official Gazette October 1, 1940.*]